June 23, 1931.  A. J. DE SANA  1,811,262
COWL MOLDING
Filed July 5, 1928
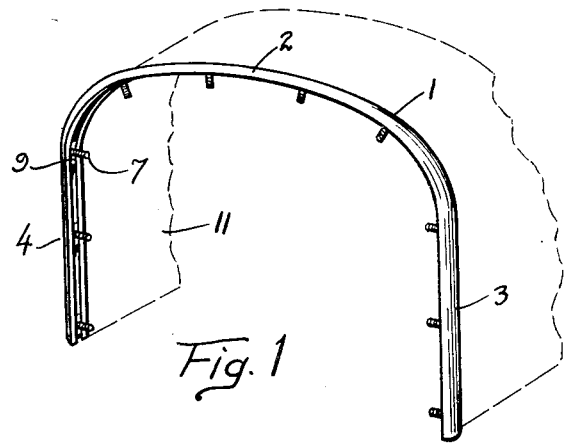
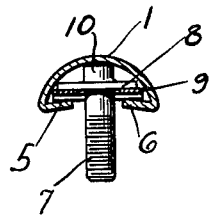 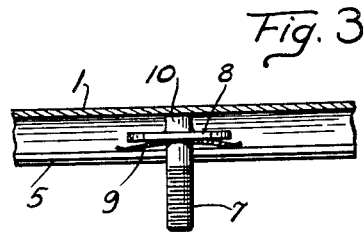
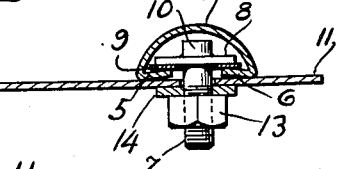 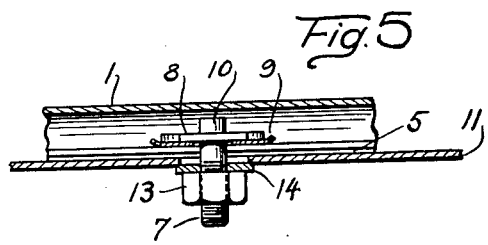
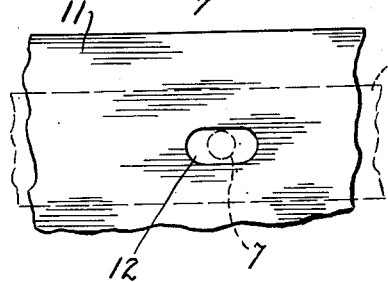 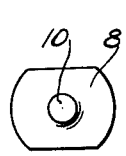 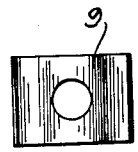
INVENTOR.
Arthur J. De Sana
BY
Stuart C. Barnes
ATTORNEY.

Patented June 23, 1931

1,811,262

UNITED STATES PATENT OFFICE

ARTHUR J. DE SANA, OF DETROIT, MICHIGAN, ASSIGNOR TO TERNSTEDT MANUFACTURING COMPANY, OF DETROIT, MICHIGAN, A CORPORATION OF MICHIGAN

COWL MOLDING

Application filed July 5, 1928. Serial No. 290,360.

This invention relates to a cowl molding for automobiles. The molding referred to is a metallic molding on the cowl, which is usually nickel or chromium plated for ornamental purposes.

The objects of the invention are to provide an improved form of molding, together with fastening devices for securing the molding to the cowl. The molding and fastening devices are arranged so that before the molding is mounted upon a cowl, the fastening devices are held in proper position as regards the molding for mounting purposes. In other words, the fastening devices are self-sustained on the molding so that they remain in a set position to permit an easy mounting of the molding on the cowl.

In the accompanying drawings:

Fig. 1 is the perspective view of a molding constructed in accordance with the invention, showing a number of fastening devices on the molding ready for assembly.

Fig. 2, the transverse sectional view of molding, showing one of the fastening devices.

Fig. 3 is a section taken at right angles of Fig. 2.

Fig. 4 is a section similar to Fig. 2, but showing position which the parts take when the molding is mounted upon a cowl.

Fig. 5 is a view similar to Fig. 3, but showing the parts when the molding is mounted.

Fig. 6 is a plan view of a portion of a cowl showing how the same may be provided with an elongated opening, and illustrating in dotted lines, the position of the molding and fastening device.

Fig. 7 is a plan view of the head of one of the fastening devices.

Fig. 8 is a plan view of one of the spring washers utilized in the fastening devices.

In Fig. 1 there is shown the cowl molding, which consists of a length of metal properly shaped for fitting over the cowl of an automobile. This molding is generally referenced 1. The portion 2 will lie on the top of the cowl, whereas the leg parts 3 and 4 will fit down along the sides of the cowl.

This molding is formed of flat stock which is suitably shaped for the purpose. As shown in Fig. 2, the stock is curved transversely to present a bead formation and the edges of the stock are bent inwardly as at 5 and 6.

The fastening devices for this molding each takes the form of a screw threaded bolt 7, the shank of which passes in between the edges 5 and 6. This bolt is provided with a suitably shaped head 8, which is disposed within the channel formation of the molding. A normally curved spring washer 9 is interposed between the head of the bolt and the edges 5 and 6. The head of the bolt may be advantageously provided with a projection 10, the purpose of which will presently appear.

The cowl on which this molding is to be applied is shown at 11, and the same is provided with a number of openings 12. The number of these openings will correspond with the number of fastening devices which are placed upon the molding. These openings 12 may, if desired, be slightly elongated in the direction of the length of the molding.

In assembling this molding on the cowl, a requisite number of fastening devices are first placed on the molding, as shown in Fig. 1. This is accomplished by inserting the heads of the bolts into the end of the channel formation of the molding. These fastening devices are then properly positioned as regards the position of the openings 12 in the cowl. It will be understood that in the assembly of a particular car or model, the position of the openings 12 are unchanged and their position is known, so that bolts can be positioned on the molding so that there will be one bolt for each opening in the cowl.

The spring washer 9, which is used with these bolts permits the bolts to be moved along in the channel, but once the bolt is properly positioned, it is held in this position inasmuch as the spring washer urges the head of the bolt upwardly into contact with the inside of the molding. This is depicted in Figs. 2 and 3.

Where the head of the bolt is provided with a projection, as illustrated at 10, this projection contacts centrally with the inside of the molding to effect a frictional engagement between the bolt and molding. However, projection 10 may be dispensed with, and in this case the spring washer would cause the edges of the bolt head to contact with the inside of the molding.

This molding may now be placed over the cowl, and the bolts being properly positioned, will line up with the holes 12, whereupon a nut 13 may be placed upon each bolt and tightened. This draws the head of the bolt down, straightens out the curved spring and clamps the edges 5 and 6 to cowl. There is used preferably a deformable washer 14, such as a lead washer, between the cowl and the nut 13. This washer will bend to the configuration of the cowl and molding, where a bolt is used at the point of curvature, and also this washer may be compressed securely against the inside of the cowl so as to tightly engage around the openings 12, and thus aid in making the structure waterproof.

It will be observed that the spring washers not only serve as temporary positioning means for the bolts, but also serve as lock washers and as anti-rattling elements.

What I claim is:

1. A molding comprising a strip of metal stock fashioned transversely into a bead formation, the edges of the stock extending inwardly of the bead, fastening means overlying said edges and projecting therefrom for securing the molding to a support, and separate spring means for urging the fastening means into frictional engagement with the molding whereby such fastening means is automatically and frictionally held in position prior to the securing of the molding to the support.

2. An automobile cowl molding for attachment to a cowl which is provided with openings for the reception of fastening bolts, comprising a strip of metal curved transversely into a hollow bead formation, the edges of the strip being turned inwardly toward each other, a plurality of fastening bolts each having a head positioned within the hollow bead said bolts being adapted to pass through the apertures in the cowl for attaching the molding to the cowl, and a spring washer disposed between the head of each bolt and the inturned edges, which normally urges the head of the bolt into contact with the inside of the hollow bead, whereby the several bolts may be positioned on the molding in accordance with the position of the apertures in the cowl, and held in such position by frictional engagement with the molding.

In testimony whereof I affix my signature.

ARTHUR J. DE SANA.